April 20, 1965 G. LEUNIG 3,179,091
INTERNAL COMBUSTION ENGINE
Filed Dec. 8, 1959
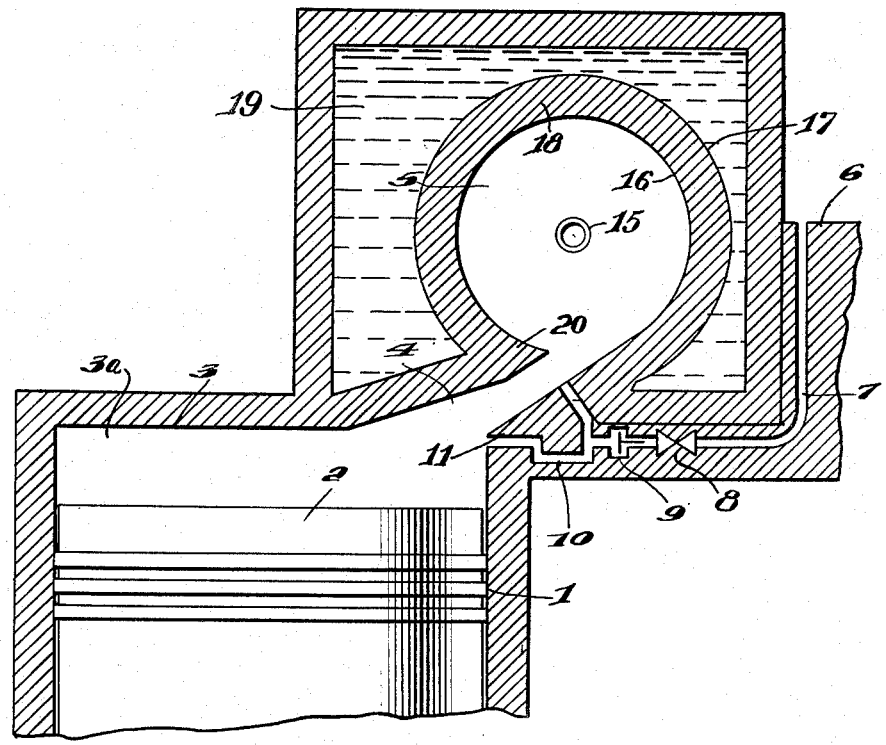

3,179,091
INTERNAL COMBUSTION ENGINE
Günther Leunig, Bad Homburg, Germany, assignor to Gesellschaft für Linde's Eismaschinen Aktiengesellschaft, Hollriegelskreuth, near Munich, Germany, a company of Germany
Filed Dec. 8, 1959, Ser. No. 858,190
1 Claim. (Cl. 123—32)

It is generally believed that the shortcomings of conventional, high-speed diesel engines—such as poor utilization of air, incomplete combustion, high fuel consumption—are due to the fact that it was not possible to obtain the desired uniform distribution of the fuel in the combustion air. Despite a considerable improvement of the injection nozzles which distribute the fuel particularly well, the engine was—contrary to expectation—not only very noisy, but the utilization of the air was still poor and, consequently, much soot was contained in the exhaust gas. This led to a change in the conceptions of the course of ignition and combustion in the engine. The reaction course can vary, depending on the respective conditions. With slow heating of the fuel in admixture with air, the less stable substances formed at the start of the reaction, such as organic peroxides, are decomposed into relatively stable intermediate products, such as aldehydes, ketones and olefins whose oxidation with the atmospheric oxygen finally leads—through additional intermediate stages—to the end products of combustion, viz., carbon dioxide and water. With rapid heating and pressure increases, however, the organic peroxides are split into free radicals which react immediately with the fuel molecules so that the process ends up as a chain reaction. The individual reaction takes place so rapidly that the air can not flow in sufficiently, even when mixed thoroughly with the fuel; consequently, inert carbon is left over at the end, and frequently finds no occasion to burn. With rapid heating the chemical reaction thus runs ahead—figuratively speaking—of the physical process of the formation of the mixture. High combustion pressures, great noise and incomplete combustion are the result. These rules apply principally to the combustion in the diesel engine and in the Otto engine.

For the diesel engine is was concluded that the amount of fuel necessary for a working cycle should be composed preferably of two partial amounts, viz., a smaller portion which starts the ignition process, and a larger portion which has to be protected against too rapid heating. In order to achieve this, the fuel is injected onto the combustion chamber wall in the same direction with an air flow produced in the combustion chamber, where it forms a thin film that evaporates gradually. The fuel vapor is then ignited externally, to the extent of its formation, by the "ignition flame" which first developed, for example, from a small self-ignited portion of the fuel close to the injection nozzle.

The engines built according to this method prove noiseless, economical and indifferent to the fuel. However, they require an expensive injection mechanism with a high-pressure pump, whose required output has to be deducted from the engine output, and which increases the specific fuel consumption.

The applicant has discovered that the prior art, high pressure injection means and method, not only are quite expensive and cumbersome, but even more important, they are *inefficient*. He has discovered that the fuel-air mixture does not become thoroughly mixed, where the prior art, high-pressure injection means for introducing the fuel into the air stream are utilized. His novel apparatus and method overcome this defect in the prior art teachings, by admitting the liquid fuel into the transfer channel at pipeline pressure, where it easily is picked up and thoroughly mixed with the high speed stream of air, before this "mixture" enters the secondary combustion chamber. By his newly conceived apparatus and method, there results much less cokeing and clogging in the transfer channel; much more complete utilization of the oil used for creating the fuel-air mixture, and consequently, less liquid fuel required and greater efficiency of operation of the internal combustion engine.

The object of the present invention is the provision of an internal combustion engine in which a combustion chamber is connected by means of a transfer-channel with the combustion space above the piston. The invention is characterized in that the inside sectional area of the intake of the transfer channel, directed tangentially to the wall of the combustion chamber suitable for a directed flow that constantly changes its direction, is smaller than the maximum sectional area of the combustion chamber, so that the vaporized and fine liquid portions of the fuel-air mixture displaced into the combustion chamber—which portions react quickly and therefore ignite easily—are contained in the core of the stream, and the coarse, liquid portions are contained in a slower reacting jacket; and that the latter are ejected to the combustion chamber wall; and that finally the wall temperatures of this portion of the combustion chamber are kept in a range which makes possible the evaporation of the liquid fuel but is below the decomposition temperature of the fuel molecules.

The invention is based on the principle that the fuel-air mixture, formed in any desired manner inside or outside the engine, is accelerated to such a speed that it is centrifuged, since the portions with a small mass but relatively large surface, which react quickly chemically, are separated from the portions with a great mass and relatively small surface. The coarser fuel droplets ejected to the combustion chamber wall form a film which evaporates by the contact with the hot combustion chamber wall and the hot air passing over it, the fuel vapor being externally ignited to the degree as it is formed, that is, in small partial amounts, by the core formed during the centrifugation of the mixture, which ignites easily and acts then as an ignition flame. Since, on the one hand, the finest fuel droplets are found in the interior of the core, apart from the fuel vapor, and on the other hand, the highest temperatures of the engine in operation occur in this core, the most favorable conditions exist there for the auto-ignition of the air-fuel mixture and thus for the formation of an ignition flame. A part of the fuel-air mixture can be made to ignite spontaneously in the core of the combustion chamber. The formation of the ignition flame can be enhanced, however, by injecting a small amount of self-igniting fuel into this core. The necessary injection device need only be dimensioned in this case for a small portion of the total amount of fuel to be introduced. But the ignition can also be started by a spark ignition which is known per se.

In order to insure that the fuel droplets ejected to the combustion chamber wall evaporate easily whilst their molecules are not decomposed, the temperature of the combustion chamber wall is kept, for example, in a range of about 300° C. to 350° C.

The application of the idea of the invention to diesel engines permits a uniform smooth and complete combustion of the fuel with good utilization of the air, without the necessity of bringing the fuel to be introduced to a high pressure by means of an expensive and sensitive device which is actually only used to atomize but a small portion of the total amount of fuel required and which otherwise only serves to bring the bulk of the fuel to the combustion chamber wall.

The introduction into the combustion chamber of the amount of fuel necessary for a working cycle can be effected in different ways, depending on the circumstances: for example, by means of compressed air—similar to the operation of an air injection engine—through an injection pump; by utilizing a static pressure on the fuel; or by the suction effect of streaming air.

On principle the combustion chamber according to the invention can be arranged in the cylinder head or in the piston or at any suitable place to be connected with the engine cylinder.

In order to insure the starting of the cold engine without any aids, particularly an engine of small structural dimensions, and in order to improve the combustion, it is advisable if the fuel, which arrives on the circumferential wall of the chamber in the liquid state and which—due to the influences of inertia and friction—is cycled at a lower velocity than the air-fuel vapor vortex in the chamber, is sprayed into the interior of the chamber where the temperatures are considerably higher and the excess of air is greater than immediately adjacent the chamber wall.

The improvement of the ignition and combustion can be accounted for as follows:

During its rotation, the fuel-liquid ring—as far as it is not yet evaporated—reaches with its front wave also the intake of the connecting channel to the cylinder. The fuel-liquid ring is engaged by the fresh air flowing in with high speed, during the duration of the compression stroke, through the channel and is atomized. The relatively coarse droplets formed arrive at first—before they travel to the circumferential wall of the chamber under the effect of their inertia—at the inner border of the vortex. Since the fuel portions which evaporate least readily are generally best ignitable, they are given at this point an opportunity for spontaneous ignition. Since during the short time in which the droplets are in suspension after leaving the break-away edge their surface temperature remains frequently too low for the formation of a gas envelope in which the ignition can start, the path which the fuel droplets have to cover when traversing the channel intake is extended according to the invention, and this path is placed in the range of higher temperatures, by designing the disc-shaped combustion chamber, for example, at its circumference, not in circular form, but rather in the form of a spiral or a similar suitable curve and by providing a break-away edge for the liquid ring at a suitable point.

It is also important that the inner wall of an axially symmetrical combustion chamber terminate in an inwardly directed tip or sharp edge in the direction of motion of the air-fuel mixture flowing in obliquely-tangentially on one side and moving helically in the chamber on the other side.

When using the process according to the invention an important distinguishing feature between diesel- and Otto engine is eliminated, namely the type of formation of the mixture. The only remaining distinguishing feature is the type of ignition in connection with the compression ratio.

The invention will be further described hereinafter, and with reference to the appended drawing, in which the figure shows diagrammatically a section through the combustion chamber of an internal combustion engine according to the invention. In one cylinder 1 is disposed a piston 2, which is drawn in a position below the upper dead center. The main combustion space 3a between the piston 2 and the cylinder head 3 is connected by means of a transfer-channel 4 to a combustion chamber 5, the channel 4 being constricted in the direction of combustion chamber 5 and opens tangentially into the latter. From a fuel tank 6 a supply line 7 leads through a throttle valve 8 and a check valve 9 to a storage chamber 10, whose one side is connected by means of a scavenging duct 11 to the main combustion space 3a above the upper dead center of the piston, and whose other end is connected by means of a feed duct 12 approximately with the narrowest part of the transfer channel 4. At 15 is indicated the orifice of an injection nozzle which reaches into the substantially central part or "core" of the fuel-air current in chamber 5.

Chamber 5 is defined by a wall 16. Spaced from wall 16 is an outer housing 17 providing, between it and wall 16 an open space 18 for a body 19 of fluid coolant, to maintain the temperature of wall 16 at a desired level.

The main combustion space 3a, the transfer channel 4 and the combustion chamber 5 constitute the "combustion space." For emphasis, clarity and uniformity the combustion chambers 3a and 5 hereinafter in the claim will be designated *main combustion chamber* and *secondary combustion chamber*, respectively.

During the suction stroke of the piston, fuel streams from the fuel tank 6 through the supply line 7, the throttle valve 8 and the check valve 9 into the storage chamber 10, where it is stored for the time being. During the compression stroke the air streaming from the main combustion space 3a above the piston through the transfer channel 4 into the disc-shaped or spherical fashioned combustion chamber 5 draws the fuel out of the storage chamber 10 through the feed duct 12 and then, with formation of a rotating vortex in the combustion chamber 5 through the effect of inertia, ending in break-away tip 20 throws it partially out against the chamber wall. In this the channel 4 and the combustion chamber 5 are so fashioned and dimensioned that the mixture in the combustion chamber 5 receives a comparatively high speed of rotation, so that the heavier fuel droplets are thrown out against the combustion chamber wall which is so cooled, by means 19 known per se, that on the one hand there can set in no decomposition of the fuel, and on the other hand a certain vaporization of the fuel is assured.

This application contains subject matter in common with my U.S. application Serial No. 841,395 filed September 21, 1959, now Patent No. 3,068,845, issued Dec. 18, 1962, "Internal Combustion Engine Operating With Self Ignition," and is to be considered a continuation-in-part of the latter.

I claim:

An internal combustion engine comprising a combustion space consisting of a main combustion chamber, formed by a piston and cylinder unit, a secondary combustion chamber having a uniformly curved inner wall surface, and a transfer channel of constricted and tapered contour connecting the main and secondary chambers, with the smaller end of the taper forming the entrance to the secondary combustion chamber, said transfer channel receiving a stream of rapidly moving air with each compression stroke of the piston in the cylinder; means comprising a feed duct disposed at an angle to the transfer channel, intermediate the ends thereof, for introducing liquid fuel into the transfer channel at fuel line pressure, whereby the rapidly moving air stream in the transfer channel picks up this liquid fuel and thoroughly mixes therewith, to create the fuel-air mixture admitted to the secondary combustion chamber; said transfer channel being contoured to provide tangential entry of the fuel-air mixture therein onto the inner wall surface of the secondary combustion chamber, whereby this rapidly moving fuel-air mixture will be centrifuged, with the lighter, easily ignited component of the fuel in this fuel-air mixture being vaporized and projected into the central or core portion of the secondary combustion chamber, and the slower moving heavier component of the fuel in this fuel-air mixture being in the peripheral part of the mixture; means for maintaining the wall temperature of the secondary combustion chamber within a range of temperature that will cause the heavier component of the fuel in the fuel-air mixture to vaporize, without causing decomposition of the fuel molecules, said engine being further characterized in that means are provided which terminate in the core region of the secondary combustion chamber, for igniting the vaporized fuel particles contained in the fuel air mixture in the secondary combustion chamber.

References Cited in the file of this patent

UNITED STATES PATENTS

| | | |
|---|---|---|
| 1,437,396 | Brush | Dec. 5, 1922 |
| 2,262,981 | Weber | Nov. 18, 1941 |
| 2,907,308 | Meurer et al. | Oct. 6, 1959 |

FOREIGN PATENTS

| | | |
|---|---|---|
| 748,478 | France | Apr. 18, 1933 |
| 949,014 | Germany | Sept. 13, 1956 |
| 417,221 | Great Britain | Oct. 1, 1934 |
| 664,175 | Great Britain | Jan. 2, 1952 |
| 414,107 | Italy | June 27, 1946 |
| 186,633 | Switzerland | Sept. 30, 1936 |
| 247,829 | Switzerland | Mar. 31, 1947 |